United States Patent
McGuire

(10) Patent No.: US 9,107,391 B1
(45) Date of Patent: Aug. 18, 2015

(54) MULTIPLE PET LEASH HOLDING DEVICE

(71) Applicant: Janis McGuire, Salinas, CA (US)

(72) Inventor: Janis McGuire, Salinas, CA (US)

( * ) Notice: Subject to any disclaimer, the term of this patent is extended or adjusted under 35 U.S.C. 154(b) by 120 days.

(21) Appl. No.: 13/868,154

(22) Filed: Apr. 23, 2013

(51) Int. Cl.
*A01K 27/00* (2006.01)

(52) U.S. Cl.
CPC .................................... *A01K 27/003* (2013.01)

(58) Field of Classification Search
CPC ....... A01K 27/003; A01K 1/04; A01K 27/00; E01H 2001/1273; A45B 3/00
USPC ............ 119/795, 799, 770; D9/434; 294/159; D34/28; 278/5–17
IPC ....................................................... A01K 27/00
See application file for complete search history.

(56) References Cited

U.S. PATENT DOCUMENTS

| | | | |
|---|---|---|---|
| D35,096 S * | 9/1901 | Carry | D34/28 |
| 1,137,909 A * | 5/1915 | Rusfeldt | 294/33 |
| D281,631 S | 12/1985 | Konar | |
| D386,409 S | 11/1997 | Santini | |
| D388,326 S * | 12/1997 | Gurry et al. | D9/434 |
| 5,852,988 A | 12/1998 | Gish | |
| 5,901,668 A | 5/1999 | Goodger, Sr. | |
| 6,237,539 B1 | 5/2001 | Sporn | |
| 6,247,428 B1 * | 6/2001 | Mireles | 119/795 |
| 6,247,739 B1 | 6/2001 | Lyon | |
| 7,726,261 B2 * | 6/2010 | Everhart | 119/795 |
| 8,104,145 B1 | 1/2012 | Hajianpour | |
| 8,151,737 B1 * | 4/2012 | Alonzo et al. | 119/799 |
| 2004/0201236 A1 * | 10/2004 | Adelson | 294/159 |

* cited by examiner

*Primary Examiner* — Kathleen Alker

(57) ABSTRACT

The multiple pet leash holding device is a device that is adapted to hold multiple pet leashes simultaneously and in an untangled arrangement so that a pet walker can walk multiple pets simultaneously. The device is constructed of non-moving parts, and includes a grip member perpendicularly oriented with respect to a support member. A distal end of the support member includes leash holder members that extend laterally therefrom, and onto which the looped end of multiple pet leashes may be placed. Each leash holder member includes a first holder member that is perpendicularly oriented on a distal end of the leash holder member. The first holder member includes a second holder member acutely oriented at a first distal end in order to prevent unintended separation of the looped end of the pet leashes there from.

1 Claim, 3 Drawing Sheets

MULTIPLE PET LEASH HOLDING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of pet leashes, more specifically, a device that can hold a plurality of pet leashes.

Pets require exercise, which requires a pet owner to walk with a leash. This usually poses no problem where the pet owner is walking one or two pets. However, this can become a difficult task where the pet owner is trying to simultaneously walk a multitude of pets. There has been a plurality of products that enable a pet owner to handle a multitude of pet leashes simultaneously. However, these products include moving parts or are overly cumbersome. What is needed is a device that can support and control a multitude of leash pets, and which is constructed of a single item construction. The device of the present application addresses this need.

B. Discussion of the Prior Art

As will be discussed immediately below, no prior art discloses a device adapted to hold multiple pet leashes simultaneously and in an untangled arrangement so that a pet walker can walk multiple pets simultaneously; wherein the device is constructed of non-moving parts, and includes a grip member perpendicularly oriented with respect to a support member; wherein a distal end of the support member includes leash holder members that extend laterally there from, and said holder members are configured such that the looped end of multiple pet leashes may be placed; wherein the leash holder members each include a first holder member that is perpendicularly oriented on a distal end of the leash holder member; wherein the first holder member includes a second holder member acutely oriented at a first distal end in order to prevent unintended separation of the looped end of the pet leashes there from.

The Sporn patent (U.S. Pat. No. 6,237,539) discloses a multiple dog leash assembly. However, the assembly is not a single-piece construction that enables a pet walker to manage a plurality of leashed pets.

The Goodger, Sr. patent (U.S. Pat. No. 5,901,668) discloses an animal leash for multiple animals. However, the leash is not a device that includes leash holder members that engage looped ends of multiple leashes.

The Hajianpour patent (U.S. Pat. No. 8,104,145) discloses a handle for a pet leash. However, the handle does not include leash holder members that enable looped ends of leashes to attach thereon.

The Gish patent (U.S. Pat. No. 5,852,988) discloses an anti-tangle multiple pet walking leash. However, the leash is not a device configured to secure multiple looped ends of pet leashes thereto.

The Lyon patent (U.S. Pat. No. 6,247,739) discloses a device for carrying containers. However, the carrying containers is not a device uniquely adapted to secure a multitude of looped ends of leashes in order to walk a plurality of leashed pets.

The Santini patent (U.S. Pat. No. Des. 386,409) illustrates an ornamental design for a grocery bag handle, which is not adapted for use with looped ends of a pet leash.

While the above-described devices fulfill their respective and particular objects and requirements, they do not describe a device adapted to hold multiple pet leashes simultaneously and in an untangled arrangement so that a pet walker can walk multiple pets simultaneously; wherein the device is constructed of non-moving parts, and includes a grip member perpendicularly oriented with respect to a support member; wherein a distal end of the support member includes leash holder members that extend laterally there from, and said holder members are configured such that the looped end of multiple pet leashes may be placed; wherein the leash holder members each include a first holder member that is perpendicularly oriented on a distal end of the leash holder member; wherein the first holder member includes a second holder member acutely oriented at a first distal end in order to prevent unintended separation of the looped end of the pet leashes there from. In this regard, the multiple pet leash holding device departs from the conventional concepts and designs of the prior art.

SUMMARY OF THE INVENTION

The multiple pet leash holding device is a device that is adapted to hold multiple pet leashes simultaneously and in an untangled arrangement so that a pet walker can walk multiple pets simultaneously. The device is constructed of non-moving parts, and includes a grip member perpendicularly oriented with respect to a support member. A distal end of the support member includes leash holder members that extend laterally therefrom, and onto which the looped end of multiple pet leashes may be placed. Each leash holder member includes a first holder member that is perpendicularly oriented on a distal end of the leash holder member. The first holder member includes a second holder member acutely oriented at a first distal end in order to prevent unintended separation of the looped end of the pet leashes there from.

It is an object of the invention to provide a device that enables a pet walker to manage a plurality of leashed pets via a single device.

A further object of the invention is to provide a device that has no moving parts, and is of a single-piece construction.

A further object of the invention is to provide a leash holder members that enable multiple looped ends of leashes to be secured thereon.

A further object of the invention is to provide a grip member that is perpendicularly oriented with a support member, which in turn is in connection with the leash holder members.

These together with additional objects, features and advantages of the multiple pet leash holding device will be readily apparent to those of ordinary skill in the art upon reading the following detailed description of presently preferred, but nonetheless illustrative, embodiments of the multiple pet leash holding device when taken in conjunction with the accompanying drawings.

In this respect, before explaining the current embodiments of the multiple pet leash holding device in detail, it is to be understood that the multiple pet leash holding device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multiple pet leash holding device.

It is therefore important that the claims be regarded as including such equivalent construction insofar as they do not depart from the spirit and scope of the multiple pet leash holding device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A multiple pet leash holding device 100 (hereinafter invention) includes a grip member 101 that is a triangularly-shaped member with diagonal members 102 that converge to connect with a support member 110. The support member 110 is perpendicularly-oriented with respect to the grip member.

Figure 1:
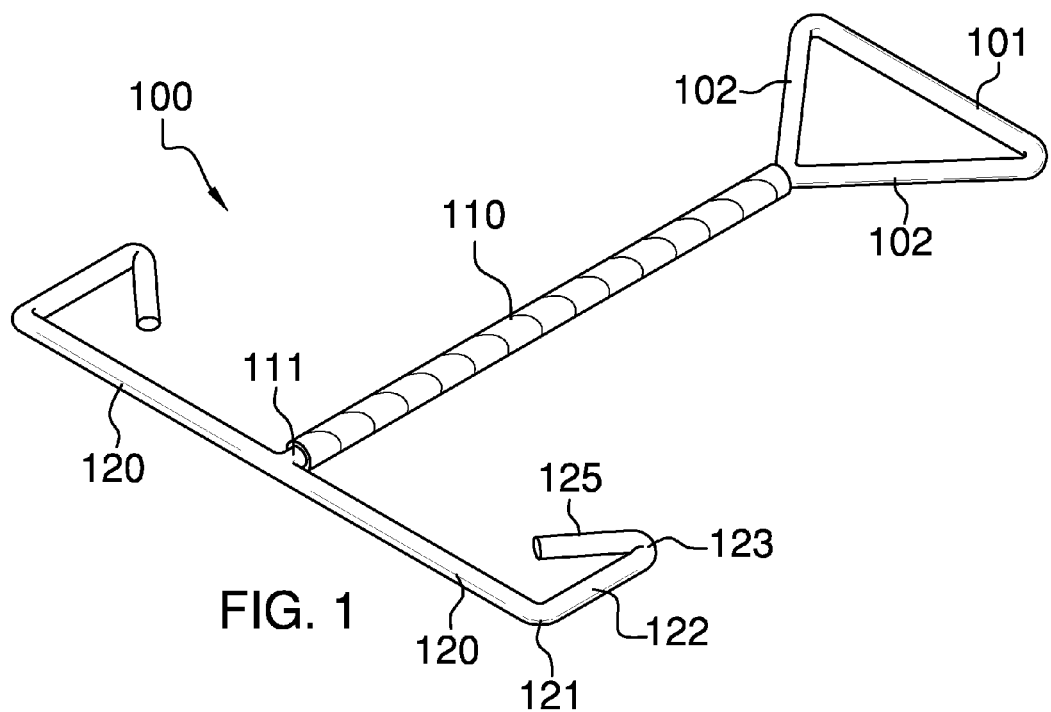
FIG. 1 illustrates a perspective view of the multiple pet leash holding device by itself.
Figure 2:
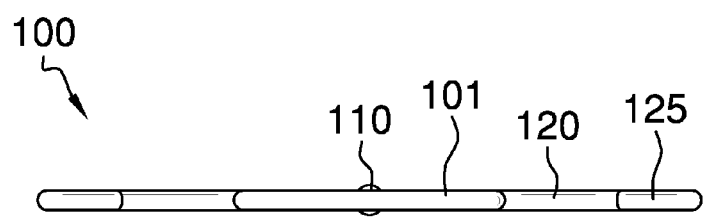
FIG. 2 illustrates a side view of the multiple pet leash holding device by itself.
Figure 3:
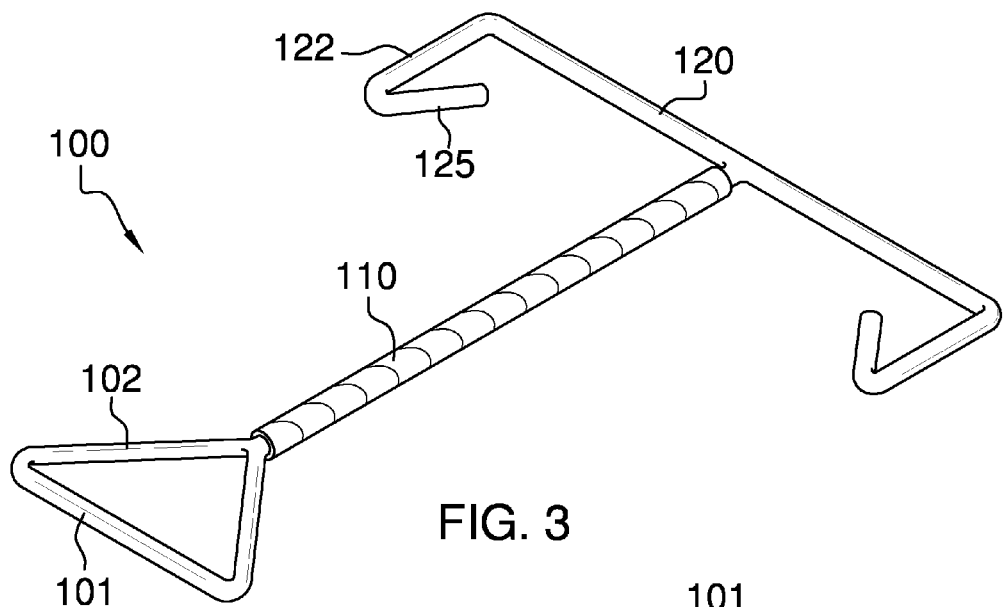
FIG. 3 illustrates a rear, perspective view of the multiple pet leash holding device by itself.
Figure 4:
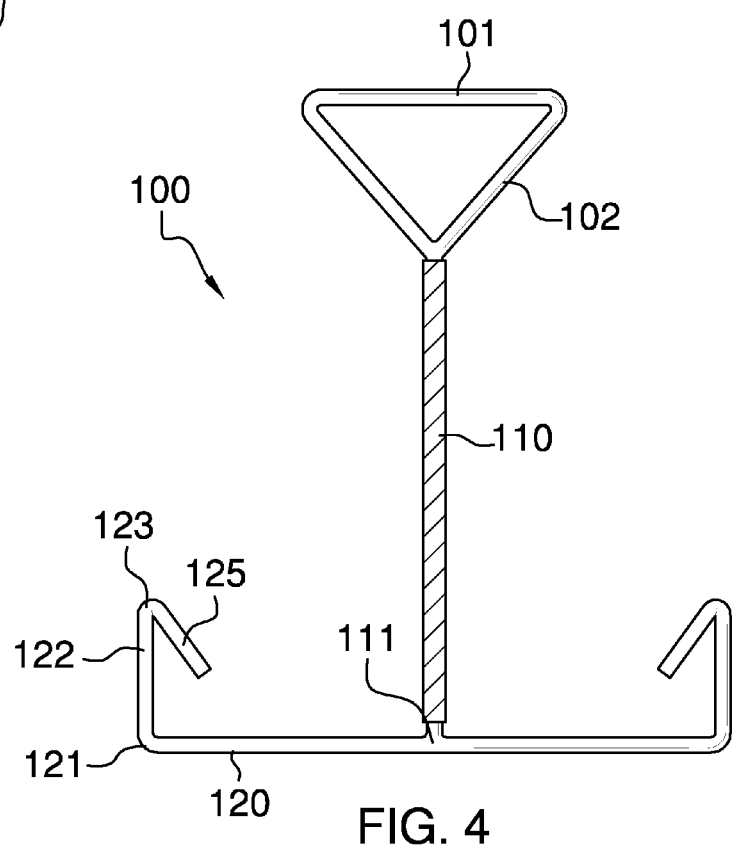
FIG. 4 illustrates a front view of the multiple pet leash holding device.
Figure 5:
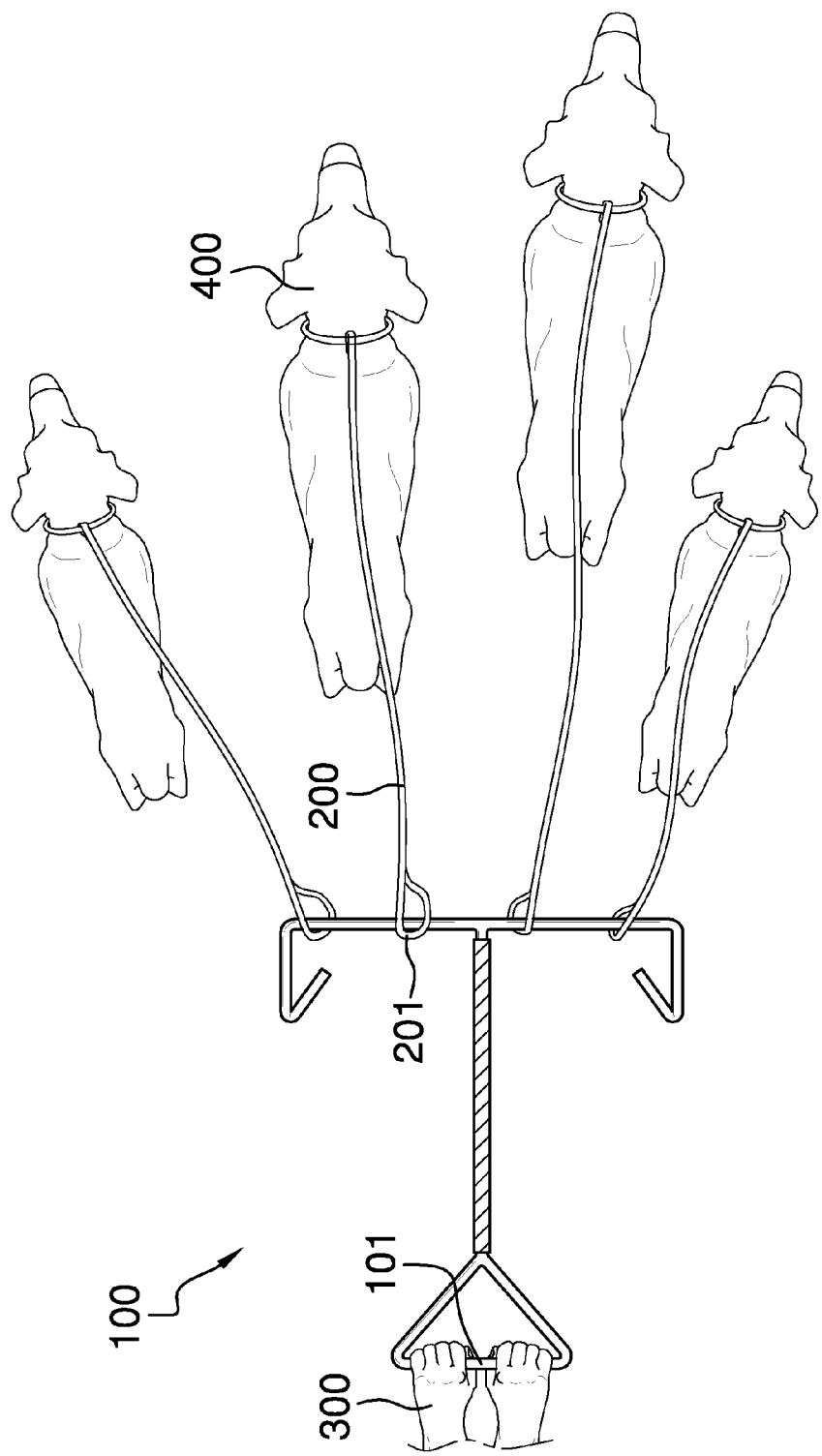
FIG. 5 illustrates a view of the multiple pet leash holding device in use with a plurality of leashed pets.

The support member 110 includes a distal end 111 at which point a pair of leash holder members 120 extend therefrom. The leash holder members 120 extend in an opposing configuration. Moreover, the grip member 101 and the leash holder members 120 are aligned in order to form a thin profile, which is depicted in FIG. 2. It shall be noted that the overall construction of the invention 100 is comprised of no moving parts, and may be constructed of a single piece.

The leash holder members 120 are each further defined with a first holder member 122 that is perpendicularly oriented on a distal end 121 of the leash holder member 120. The first holder member 122 includes a second holder member 125 acutely oriented at a first distal end 123 in order to prevent unintended separation of a looped end 201 of a pet leash 200 there from.

The invention 100 is used by placing the loop ends 201 of multiple pet leashes 200 onto the leash holder members 120. An end user 300 shall grasp the invention 100 via the grip member 101. It shall be noted that the configuration of components comprising the invention 100 is such that the pet leashes 200 shall not become entangled, and the end user 300 is able to control and manage all leashed pets 400 thereon.

It shall be noted that the overall shape of the invention 100 resembles that of an anchor. It shall be noted that all components of the invention 100 may be made of a multitude of materials comprising plastics, wood, metal, carbon fiber composite.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A multiple pet leash holding device comprising:
a grip member connected to a support member from which leash holder members extend;
wherein the leash holder members secure and support a plurality of looped ends of pet leashes thereon such that an end user is able to walk a plurality of pets leashed therefrom;
wherein the pet leashes are supported in general alignment so as to prevent entanglement with respect to one another;
wherein the grip member is a triangularly-shaped member with diagonal members that converge and connect with the support member; wherein the grip member is grabbed via the end user;
wherein the support member is perpendicularly oriented with respect to the grip member;
wherein the support member is further defined to have a distal end; wherein the leash holder members extend from the distal end of the support member; wherein the leash holder members extend in an opposing configuration with respect to one another;
wherein the grip member and the leash holder members are aligned in order to form a thin profile;
wherein the leash holder members further comprise a first holder member that is perpendicularly oriented on a distal end of each leash holder member;
wherein each first holder member includes a second holder member acutely oriented at a first distal end; wherein each second holder member prevents unintended separation of any one of the plurality of looped ends of the pet leashes therefrom.

* * * * *